(12) United States Patent
Schneider et al.

(10) Patent No.: US 9,737,916 B2
(45) Date of Patent: Aug. 22, 2017

(54) DYNAMIC RESONANCE SYSTEM AND METHOD FOR THE ANTI-ICING AND DE-ICING OF INLET GRIDS

(71) Applicants: William Schneider, Acton, CA (US); Yvette Wood, Palmdale, CA (US); Andrew Peduchi, Canyon County, CA (US)

(72) Inventors: William Schneider, Acton, CA (US); Yvette Wood, Palmdale, CA (US); Andrew Peduchi, Canyon County, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 53 days.

(21) Appl. No.: 14/833,306

(22) Filed: Aug. 24, 2015

(65) Prior Publication Data
US 2017/0056939 A1    Mar. 2, 2017

(51) Int. Cl.
| | |
|---|---|
| B08B 7/04 | (2006.01) |
| B08B 7/02 | (2006.01) |
| B64D 15/16 | (2006.01) |
| F01D 25/02 | (2006.01) |
| F02C 7/055 | (2006.01) |
| F24F 11/00 | (2006.01) |
| F02C 7/04 | (2006.01) |
| B64D 33/02 | (2006.01) |

(52) U.S. Cl.
CPC ............... *B08B 7/02* (2013.01); *B64D 15/16* (2013.01); *F01D 25/02* (2013.01); *F02C 7/04* (2013.01); *F02C 7/055* (2013.01); *F24F 11/0086* (2013.01); *B64D 2033/0233* (2013.01); *F05D 2260/96* (2013.01); *F24F 2011/0087* (2013.01)

(58) Field of Classification Search
CPC ..................................... B08B 7/02; F02C 7/04
See application file for complete search history.

(56) References Cited

U.S. PATENT DOCUMENTS

| | | |
|---|---|---|
| 3,549,964 A | 12/1970 | Levin et al. |
| 3,672,610 A | 6/1972 | Levin |
| 3,779,488 A | 12/1973 | Levin |
| 4,149,689 A | 4/1979 | McDonald |
| 4,629,149 A | 12/1986 | Carson et al. |

(Continued)

FOREIGN PATENT DOCUMENTS

| | | | |
|---|---|---|---|
| CN | 103 806 401 A | | 5/2014 |
| DE | 4031035 | * | 4/1992 |

(Continued)

*Primary Examiner* — Bibi Carrillo
(74) *Attorney, Agent, or Firm* — Baker Botts L.L.P.

(57) ABSTRACT

In one embodiment, a system includes an inlet grid configured to reduce distortion of an incoming airflow. The system may also include a vibration device coupled to the inlet grid and a controller communicatively coupled to the vibration device. The controller may transmit a vibration signal to the vibration device causing the vibration device to vibrate the inlet grid such that the inlet grid resonates at a natural frequency inducing a mode shape in the inlet grid. The mode shape may break up and prevent ice on the inlet grid.

9 Claims, 2 Drawing Sheets

(56) References Cited

U.S. PATENT DOCUMENTS

| | | | |
|---|---|---|---|
| 4,760,978 A * | 8/1988 | Schuyler | B64D 15/12 244/134 D |
| 4,775,118 A | 10/1988 | Daniels | |
| 5,318,253 A | 6/1994 | Levin | |
| 5,338,928 A | 8/1994 | Jamieson et al. | |
| 5,474,261 A * | 12/1995 | Stolarczyk | B64D 15/20 244/134 F |
| 5,553,815 A | 9/1996 | Adams et al. | |
| 6,102,333 A | 8/2000 | Gerardi et al. | |
| 7,451,948 B2 | 11/2008 | Al-Qutub et al. | |
| 7,556,222 B2 | 7/2009 | Al-Qutub et al. | |
| 7,770,453 B2 | 8/2010 | Ludwiczak | |
| 7,854,412 B2 | 12/2010 | Al-Khalil | |
| 8,087,297 B2 | 1/2012 | Ludwiczak | |
| 8,146,866 B2 | 4/2012 | Tenebre et al. | |
| 8,217,554 B2 | 7/2012 | Royer, Jr. et al. | |
| 8,430,359 B2 | 4/2013 | Al-Khalil | |
| 8,439,309 B2 | 5/2013 | Cardell et al. | |
| 8,517,313 B2 | 8/2013 | Gornik | |
| 8,959,768 B2 | 2/2015 | Vauchel et al. | |
| 2010/0031972 A1 * | 2/2010 | Royer, Jr. | B64D 15/00 134/1 |
| 2010/0206990 A1 | 8/2010 | Petrenko | |
| 2011/0209622 A1 * | 9/2011 | Hiner | B01D 46/0002 96/189 |
| 2011/0319008 A1 * | 12/2011 | Ameyugo | B64D 15/16 454/254 |
| 2012/0049002 A1 * | 3/2012 | Wood | G01M 9/06 244/134 F |
| 2013/0277501 A1 | 10/2013 | Delrieu | |
| 2013/0299638 A1 | 11/2013 | Gornik | |
| 2014/0252172 A1 | 9/2014 | Bridgeford | |
| 2014/0263838 A1 | 9/2014 | Snir et al. | |
| 2016/0169761 A1 * | 6/2016 | Campos-Ortega | G01L 11/002 702/50 |

FOREIGN PATENT DOCUMENTS

| | | |
|---|---|---|
| FR | 2964739 A1 * | 3/2012 |
| GB | 1 543 584 A | 4/1979 |
| WO | 2009 019696 A2 | 2/2009 |

* cited by examiner

US 9,737,916 B2

1

DYNAMIC RESONANCE SYSTEM AND METHOD FOR THE ANTI-ICING AND DE-ICING OF INLET GRIDS

TECHNICAL FIELD

This disclosure generally relates to air flow mechanics and, more specifically, to a dynamic resonance system and method for the anti-icing and de-icing of inlet grids.

BACKGROUND

Air intake systems are engineered to maximize engine efficiency and power by providing airflow with minimal turbulence and interference. Air intake systems may also provide the necessary airflow for turbines, air conditioning systems, and ventilation systems. A number of environmental, design, and aesthetic considerations may affect the ability of an air intake system to provide a sufficient airflow.

SUMMARY OF PARTICULAR EMBODIMENTS

In accordance with the present disclosure, disadvantages and problems associated with a dynamic resonance system and method for the anti-icing and de-icing of inlet grids may be reduced or eliminated.

In one embodiment, a system includes an inlet grid configured to reduce distortion of an incoming airflow. The system may also include a vibration device coupled to the inlet grid and a controller communicatively coupled to the vibration device. The controller may transmit a vibration signal to the vibration device causing the vibration device to vibrate the inlet grid such that the inlet grid resonates at a natural frequency inducing a mode shape in the inlet grid. The mode shape may break up and prevent ice on the inlet grid.

In one embodiment, a method includes detecting, using a controller, an atmospheric condition sufficient for the accumulation of ice on an inlet grid, the inlet grid configured to reduce the distortion of an airflow passing through the inlet grid. The method further comprises transmitting, using the controller, a vibration signal to a vibration device coupled to the inlet grid. The method further comprises resonating, by the vibration device in response to the vibration signal, the inlet grid at a natural frequency of the inlet grid, thereby inducing a mode shape in the inlet grid. The mode shape may break up and prevent ice on the inlet grid.

Technical advantages of the disclosure include allowing for a larger volume of air to flow through an inlet grid during icing conditions by optimizing the percentage of the inlet grid covered by the vibrational excitation of the anti-icing system. Another technical advantage may be a reduction in the amount of power consumed by the system by operating at resonant frequencies to produce a simultaneous superposition of multiple mode shapes on the inlet grid. Another technical advantage may include preventing structural damage to the anti-icing system by utilizing low-level, dynamic excitation for short bursts of time, thereby reducing mechanical fatigue. Other technical advantages will be readily apparent to one skilled in the art from the following figures, descriptions, and claims. Moreover, while specific advantages have been enumerated above, various embodiments may include all, some, or none of the enumerated advantages.

2

Figure 1:
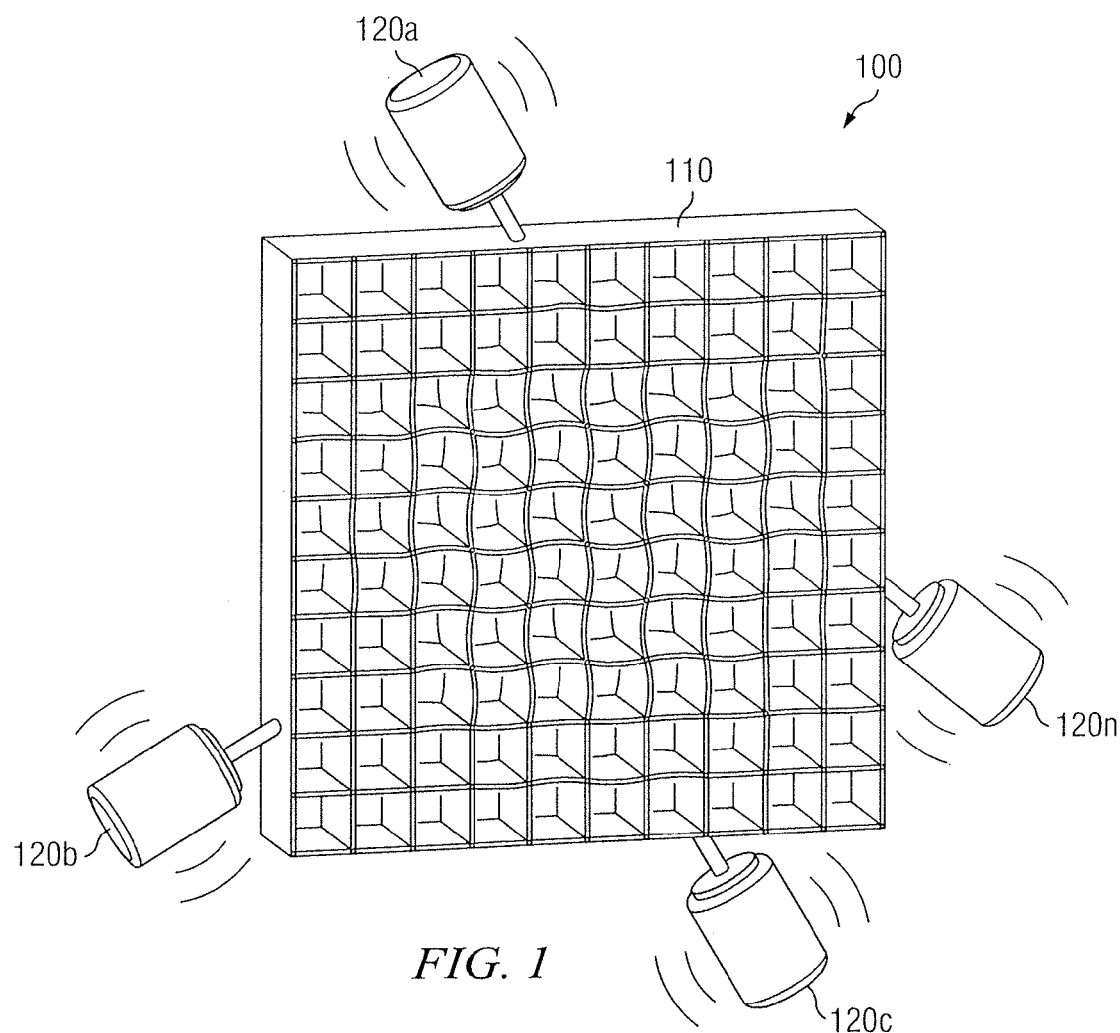
FIG. 1 illustrates a perspective view of an example dynamic resonance system according to certain embodiments.
Figure 2:
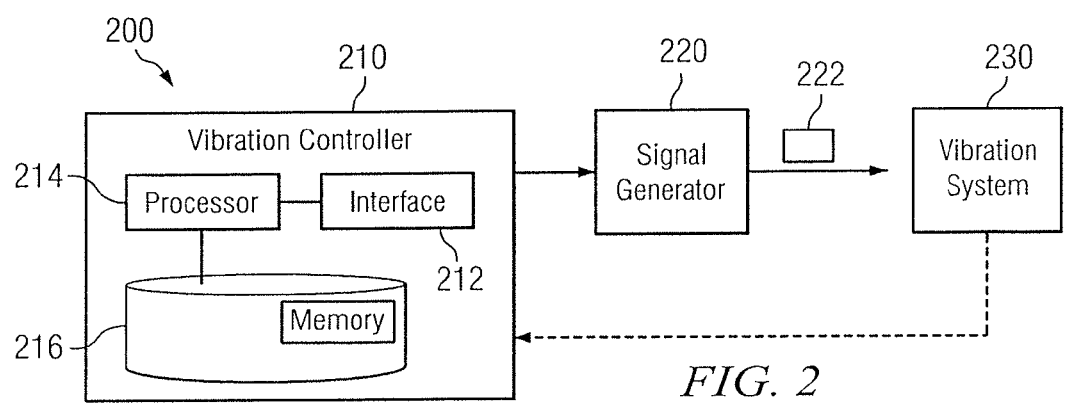
Figure 3:
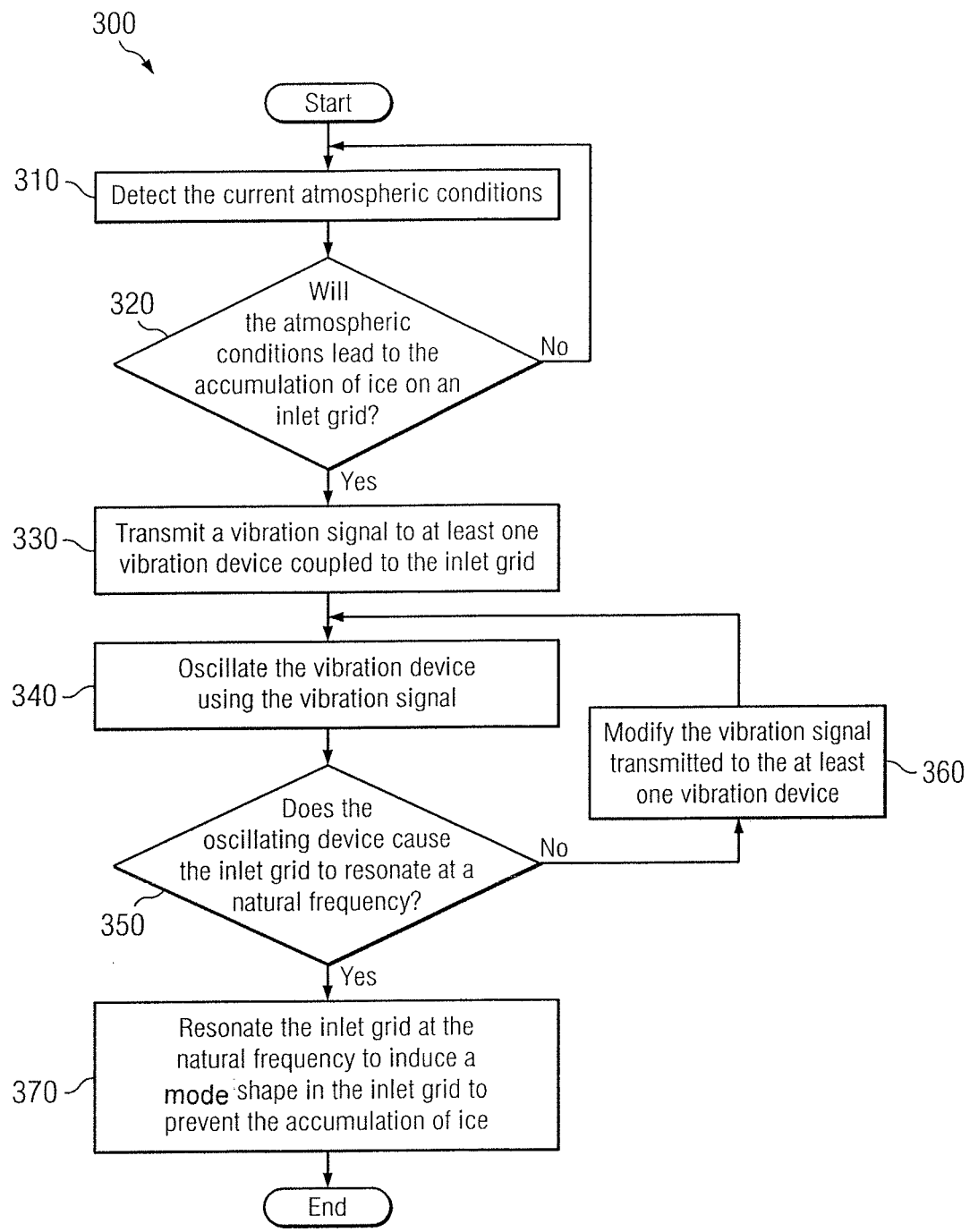

FIG. 2 illustrates an example block diagram of a dynamic resonance system according to certain embodiments; and FIG. 3 is a flowchart illustrating a dynamic resonance method that may be utilized by the systems of FIGS. 1 and 2, according to certain embodiments.

DESCRIPTION OF EXAMPLE EMBODIMENTS

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 3, where like numbers are used to indicate like and corresponding parts.

Air intake systems are engineered to maximize engine efficiency and power by providing airflow with minimal turbulence and interference. Air intake systems may also provide the necessary airflow for turbines, air conditioning systems, and ventilation systems. A number of environmental, design, and aesthetic considerations may affect the ability of an air intake system to provide a sufficient airflow.

For example, aircraft occasionally fly through atmospheric conditions that lead to the accumulation of ice on certain external aircraft surfaces and components. A critical component that is susceptible to ice buildup is the engine inlet grid flow straightener. The inlet grid provides uniform airflow to the engine by reducing air distortion and asymmetric airflows. If the inlet grid accumulates ice, the aerodynamic flow of incoming air may be sufficiently reduced, resulting in reduced engine performance and/or an engine stall.

The accretion of ice on an inlet grid may occur under a number of scenarios. At certain elevations and temperatures, in-flight icing may occur when super cooled water (i.e., rime ice—water in liquid form below 0° C.) freezes on impact with the inlet grid. Rime ice typically forms on leading edges making inlet grids especially susceptible to ice accumulation.

To avoid the accumulation of ice on inlet grids, flight plans are modified to avoid atmospheric icing conditions. However, modified flight plans result in inefficient routes and increased fuel consumption. Other solutions, such as the use of heating elements to melt accumulated ice, require significant power consumption. Still other remedies, such as mechanical wiper systems, are limited in the inlet grid area that the wiper is able to clear.

To breakup and prevent the accumulation of ice on an inlet grid, embodiments of the present disclosure apply vibrational excitation to the inlet grid using one or more vibration devices. The one or more vibration devices introduce a dynamic excitation force that simultaneously excites one or more natural frequencies and mode shapes of the inlet grid.

A natural or resonant frequency of an inlet grid describes the frequency at which vibrations in the inlet grid respond at greater amplitude than at other, non-resonant frequencies. The pattern of vibrational motions is known as the mode shape. A mode shape may have one or more nodes and anti-nodes. A node of the mode shape experiences little or no vibrational displacement, while the mode shape's anti-nodes may experience maximum displacement due to the vibrational forces generated at the natural frequency. A system (e.g., an inlet grid) has an infinite number of natural frequencies. Accordingly, a small vibrational force generated by the vibration devices at one or more of the inlet grid's natural frequencies may produce large vibrational forces at the one or more anti-nodes of the mode shape.

In some embodiments, the position and excitation direction of the one or more vibration devices are optimized to maximize the coverage area of the inlet grid's mode responses. The resulting multi-frequency acceleration of the grid may inhibit ice molecules from bonding to the vibrating surface of the inlet grid.

Using one or more vibration devices to apply vibrational excitation to an inlet grid provides several technical advantages not realized by current devices. Embodiments of the present disclosure may allow for a larger volume of air to flow through an inlet grid during icing conditions by optimizing the percentage of the inlet grid covered by the vibrational excitation of the anti-icing system. Another technical advantage of the disclosure may be that some embodiments reduce the amount of power consumed by the system by operating at resonant frequencies to produce a simultaneous superposition of multiple mode shapes on the inlet grid. Yet another advantage may be that some embodiments prevent structural damage of the anti-icing system by utilizing low-level, dynamic excitation for short bursts of time, thereby reducing mechanical fatigue. FIGS. 1-3 provide additional details of a dynamic resonance system and method for the anti-icing and de-icing of inlet grids.

FIG. 1 illustrates a perspective view of an example dynamic resonance system 100. System 100 includes inlet grid 110 and vibration devices 120a-n (collectively, vibration devices 120). Vibration devices 120 may operate to drive vibrational energy into inlet grid 110, breaking up ice blockages and preventing the further accumulation of ice.

Inlet grid 110 represents any suitable device operable to facilitate the intake of air. In some embodiments, inlet grid 110 acts as an airflow straightener to minimize the turbulence of the incoming air and provide sufficient airflow to an aircraft's engine.

The material of inlet grid 110 may be any suitable material sufficiently rigid to allow one or more vibration devices 120 to drive vibrational energy into inlet grid 110. In some embodiments, the material of inlet grid 110 is dictated by airflow and design requirements of system 100. For example, commercial and residential air conditioning systems may use a metallic material for inlet grid 110 that is durable and long lasting. In some embodiments, inlet grid 110 may be part of a specialized application such as jets and helicopters. In these embodiments, inlet grid 110 may be a lighter weight composite or plastic material.

In the illustrated embodiment, inlet grid 110 is shown as a square shape with square cross-section inlets. However, any suitable cross-section shape may be utilized by inlet grid 110, including circular shapes, honeycombs, and hexagonal cells. Similarly, inlet grid 110 may be any appropriate shape and material depending on the application and environment. For example, when inlet grid 110 is utilized on an airplane or helicopter, inlet grid 110 may be shaped to be aerodynamic and conform with the body of the aircraft as well as handle the required airflow levels.

The natural frequencies of inlet grid 110 may change based on the size, shape, length, mass, and material of inlet grid 110. To induce the vibrational energy in inlet grid 110, system 100 may utilize one or more vibration devices 120.

Vibration devices 120 represent any suitable devices that are operable to create mechanical vibration in inlet grid 110. Depending on the magnitude and frequency of the vibrational forces needed, vibration devices 120 may include uniform types of vibration devices or a combination of different devices. For example, in some embodiments, vibration devices 120 may include piezoelectric shakers operating at higher frequencies (e.g., 200-2000 Hz). In some embodiments, vibration devices 120 may include electromagnetic shakers operating at lower frequencies (e.g., 50-1000 Hz). In certain embodiments, vibration devices 120 may be integrated to provide a wide frequency range of operation.

A number of characteristics and operating parameters of vibration devices 120 may be controlled to optimize the coverage area of the induced mode shapes of inlet grid 110. These parameters include, but are not limited to, the natural frequencies induced by vibration devices 120, the location of vibration devices 120 on inlet grid 110, the excitation direction of vibration devices 120, the magnitude of the frequencies generated by vibration devices 120, and the duration of the applied vibrational force.

In some embodiments, each inlet grid 110 design is tested to determine the specific natural frequencies and distribution of mode shapes. By properly tuning and placing vibration devices 120, the number and duration of operation of vibration devices 120 may be reduced. Optimizing the operating parameters reduces the power consumption required to operate system 100.

In some embodiments, vibration device 120a produces one or more natural frequencies in inlet grid 110. Tuning vibration device 120a to produce a natural frequency may generate a mode shape in inlet grid 110. The mode shape generated by the natural frequency comprises one or more nodes and anti-nodes in inlet grid 110. Vibration device 120a may then drive mechanical energy into the anti-nodes of the mode shape to increase the vibration movement of inlet grid 110 at the anti-nodes. By properly tuning and locating anti-nodes in inlet grid 110, the induced vibrational energy may prevent the accumulation of ice over a significant portion of inlet grid 110.

For example, vibration device 120a may be located and operated at a frequency to produce anti-nodes dispersed throughout inlet grid 110. Vibration device 120a may then drive vibrational energy into the anti-nodes. The magnitude of the excitation energy driven into the anti-nodes may be controlled based on a number of factors such as the environmental conditions (e.g., air temperature, engine intake requirements) and airflow. The vibrational forces at the anti-nodes may then prevent the accumulation of ice on inlet grid 110.

In some embodiments, vibration devices 120 may have varying excitation directions. The excitation direction of vibration devices 120 may affect the displacement direction of anti-nodes in inlet grid 110. Vibration devices 120 may be angled to oscillate at any suitable excitation direction to optimize the vibrational energy driven into inlet grid 110.

For example, vibration device 120a may oscillate in a first direction to produce transverse waves in inlet grid 110 while vibration device 120b may oscillate in a second direction to produce longitudinal waves in inlet grid 110. Vibration devices 120 may also oscillate at varying angles with respect to inlet grid 110. For instance, vibration device 120a may be angled at 30 degrees to excite multiple mode shapes in inlet grid 110. In this manner, a single vibration device 120a may generate multiple mode shapes in inlet grid 110.

In some embodiments, each vibration device 120 may operate at a different natural frequency of inlet grid 110 to induce different mode shapes. In some embodiments, one or more vibration devices 120 may operate at a first natural frequency while one or more additional vibration devices 120 may operate at different natural frequencies. The mode shapes created by the selected natural frequencies may be superimposed and/or distributed to provide optimal coverage of inlet grid 110.

Modifications, additions, or omissions may be made to system 100 without departing from the scope of the disclosure. For example, vibration devices 120 may be combined with one or more other anti-icing techniques to improve the overall performance of system 100. For example, inlet grid 110 may be made of a hydrophobic material or coated with a hydrophobic coating that resists the accumulation of water.

Furthermore, although system 100 is described using inlet grid 110 as a part of an aircraft, system 100 may be applied to any suitable environment. For instance, system 100 may be used for other air intake systems that experience icing conditions such as equipment in freezing weather or ventilation systems in arctic climates (e.g., ocean vessels and oil platforms). As another example, system 100 may be implemented on air exhaust systems. For instance, system 100 may be implemented on the exhaust screen of a heating, ventilation, and air-conditioning (HVAC) system. In addition to displacing and preventing the build-up of ice, resonating an exhaust screen may prevent and dislodge debris from the outside of the exhaust screen. Accordingly, system 100 may be implemented in any suitable situation and environment to prevent the accumulation of ice, debris, and/or other blockages from accumulating on a screen or grid.

FIG. 2 illustrates an example block diagram 200 of a dynamic resonance system 200. System 200 includes controller 210, signal generator 220, and vibration system 230. In the illustrated embodiment, controller 210 utilizes signal generator 220 to transmit vibration signal 222 to vibration system 230.

Controller 210 represents any suitable device operable to utilize signal generator 220 to tune the vibrational energy generated by vibration devices 120. Vibration devices 120 may in turn excite discrete mode frequencies of inlet grid 110 to create steady state vibrational motion at the tuned frequencies. The vibrational motion may inhibit the accumulation of ice, and/or detach any existing ice on inlet grid 110, thereby maintaining an unobstructed airflow.

Controller 210 may take any suitable physical form. As example and not by way of limitation, controller 210 may be an embedded controller 210, a system-on-chip (SOC), a single-board computer system (SBC) (such as, for example, a computer-on-module (COM) or system-on-module (SON)), a desktop computer system, a laptop or notebook computer system, a mesh of computer systems, a server, a tablet computer system, or a combination of two or more of these. Where appropriate, controller 210 may include one or more controllers 210; be unitary or distributed; span multiple locations; span multiple machines; or reside in a cloud, which may include one or more cloud components in one or more networks. Where appropriate, one or more controllers 210 may perform without substantial spatial or temporal limitation one or more steps of one or more methods described or illustrated herein.

In the illustrated embodiment, controller 210 comprises interface 212, processor 214, and memory 216. Although this disclosure describes and illustrates a particular controller 210 having a particular number of particular components in a particular arrangement, this disclosure contemplates any suitable controller having any suitable number of any suitable components in any suitable arrangement.

In particular embodiments, interface 212 includes hardware, software, or both providing one or more interfaces for communication (such as, for example, packet-based communication) between controller 210, signal generator 220 and vibration system 230. As an example and not by way of limitation, interface 212 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable interface 212 for it. As an example and not by way of limitation, controller 210 may communicate with an ad hoc network, a local area network (LAN), a wide area network (WAN), or one or more portions of the Internet or a combination of two or more of these. One or more portions of one or more of these networks may be wired or wireless. As an example, controller 210 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Controller 210 may include any suitable interface 212 for any of these networks, where appropriate. Interface 212 may include one or more interfaces 212, where appropriate. Although this disclosure describes and illustrates a particular communication interface, this disclosure contemplates any suitable interface.

In particular embodiments, processor 214 includes hardware for executing instructions, such as those making up a computer program. As an example and not by way of limitation, to execute instructions, processor 214 may retrieve (or fetch) the instructions from an internal register, an internal cache, and/or memory 216; decode and execute them; and then write one or more results to an internal register, an internal cache, and/or memory 216. In particular embodiments, processor 214 may include one or more internal caches for data, instructions, or addresses. This disclosure contemplates processor 214 including any suitable number of any suitable internal caches, where appropriate. This disclosure contemplates processor 214 including any suitable number of any suitable internal registers, where appropriate. Where appropriate, processor 214 may include one or more arithmetic logic units (ALUs); be a multi-core processor; or include one or more processors 214. Although this disclosure describes and illustrates a particular processor 214, this disclosure contemplates any suitable processor 214.

In particular embodiments, memory 216 includes main memory for storing instructions for processor 214 to execute or data for processor 214 to operate on. As an example and not by way of limitation, processor 214 may load instructions from memory 216 to an internal register or internal cache. To execute the instructions, processor 214 may retrieve the instructions from the internal register or internal cache and decode them. During or after execution of the instructions, processor 214 may write one or more results (which may be intermediate or final results) to the internal register or internal cache. Processor 214 may then write one or more of those results to memory 216. In particular embodiments, processor 214 executes only instructions in one or more internal registers or internal caches or in memory 216 and operates only on data in one or more internal registers or internal caches or in memory 216. One or more memory buses (which may each include an address bus and a data bus) may couple processor 214 to memory 216.

In particular embodiments, one or more memory management units (MMUs) reside between processor 214 and memory 216 and facilitate accesses to memory 216 requested by processor 214. In particular embodiments, memory 216 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. In particular embodiments, memory 216 is non-volatile, solid-state memory. In particular embodiments, memory 214 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates any suitable RAM. Memory 216 may include one or more memories 216, where appropriate. Although this disclosure describes and illustrates particular memory, this disclosure contemplates any suitable memory.

Signal generator 220 represents any suitable device operable to produce electronic signals. Signal generator 220 may generate repeating or non-repeating signals. Signal generator 220 may produce digital and/or analog waveforms including, but not limited to, sine waves, saw tooth patterns, pulse signals, square waves, and triangle waves. Signal generator 220 may operate in any suitable frequency range (e.g., 1-50,000 Hz).

Controller 210 may utilize signal generator 220 to transmit vibration signal 222 to vibration device 120a. In some embodiments, controller 210 transmits a unique vibration signal 222 to each of the one or more vibration devices 120. Vibration device 120a may then oscillate according to vibration signal 222.

For example, controller 210 may utilize signal generator 220 to transmit a 100 Hz sine wave to vibration device 120a using vibration signal 222. Vibration device 120a may receive vibration signal 222 and oscillate at 100 Hz. In some embodiments, 100 Hz is a natural frequency of inlet grid 110 and the oscillations of vibration device 120a induce a mode shape corresponding to the 100 Hz natural frequency. By resonating inlet grid 110 at a natural frequency, a small input magnitude may result in a large vibrational response preventing the accumulation of ice.

Vibration system 230 includes one or more vibration devices 120 and/or sensors to drive and measure vibrational energy in inlet grid 110. In certain embodiments, system 200 may include any number of sensors including, but not limited to, accelerometers, vibrational sensors, velocity sensors, and temperature sensors. In embodiments utilizing sensors, the sensors may provide feedback to controller 210 allowing controller 210 to dynamically adjust the tuning of vibration devices 120. In some embodiments, controller 210 operates as a proportional-integral-derivative (PID) controller receiving feedback from sensors and adjusting the frequency signals of vibration devices 120.

In certain embodiments, controller 210 may transmit multiple vibration signals 222 to vibration devices 120 to produce one or more resonant frequencies in inlet grid 110. When the multiple resonant frequencies are combined with the position and excitation direction of each vibration device 120, the vibrational response of inlet grid 110 may create a simultaneous superposition of multiple mode shapes. The resulting multi-frequency acceleration of inlet grid 110 may increase the ability for system 200 to prevent the accumulation of ice on inlet grid 110.

In some embodiments, controller 210 operates as a passive system to prevent the accumulation of ice on inlet grid 110. Controller 210 may store a list of pre-determined resonant frequencies of inlet grid 110. As explained in FIG. 1, these stored frequencies may be tailored to inlet grid 110 based on the size, shape, weight, and material of inlet grid 110. Controller 210 may then transmit one or more of the stored resonant frequencies to vibration devices 120 to prevent the accumulation of ice on inlet grid 110. In some embodiments, controller 210 transmits a number of the stored resonant frequencies over a period of time. For example, controller 210 may operate vibration device 120a at a first stored resonant frequency for a first period of time (e.g., thirty seconds, a minute, five minutes) and then switch to another resonant frequency for a second period of time. In this manner, controller 210 may induce various mode shapes in inlet grid 110 using a single vibration device 120a.

In some embodiments, controller 210 operates as an active controller with feedback provided by one or more sensors of vibration system 230. Operating as an active system may provide additional technical advantages. For example, if inlet grid 110 begins to accumulate ice, the mass or stiffness of inlet grid 110 may change. This may affect the natural frequencies that cause mechanical resonance in inlet grid 110. Using feedback from the sensors (e.g., accelerometers and vibrational sensors), controller 210 may adjust the frequency of vibration devices 120 until a resonant frequency is discovered. As the vibrational energy removes the accumulated ice from inlet grid 110, controller 210 may continue to adjust the frequency transmitted to vibration devices 120 to maintain the mechanical resonance in inlet grid 110.

To minimize the power consumption of system 100, in some embodiments, controller 210 transmits vibration signal 222 to vibration devices 120 in response to detecting the presence of atmospheric conditions that lead to the accumulation of ice on inlet grid 110. For example, controller 210 may transmit vibration signal 222 to vibration devices 120 in response to determining that the air is within a predetermined temperature range (e.g., −20° C.-0° C.) Atmospheric conditions may also include whether an aircraft is traveling through clouds, flying through precipitation, or flying above a certain elevation (e.g., 30,000 feet). In some embodiments, controller 210 transmits vibration signal 222 at a predetermined time according to a flight plan or meteorological report.

Controller 210 may transmit vibration signal 222 for any suitable period of time. For example, controller 210 may transmit vibration signal 222 to vibration device 120a according to a set operating schedule (e.g., 5 minutes on, 1 minute off, 5 minutes on). In some embodiments, controller 210 may transmit vibration signal 222 while controller 210 detects the presence of atmospheric conditions that may lead to the accumulation of ice on inlet grid 110.

A component of block diagram 200, such as controller 210, may include an interface, logic, memory, and other suitable elements. An interface receives input, sends output, processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component.

Examples of a processor include one or more computers, one or more microprocessors, one or more applications, and other logic.

Modifications, additions, or omissions may be made to system 200 without departing from the scope of the invention. For example, in some embodiments, controller 210 and signal generator 220 may be integrated in vibration devices 120. As another example, vibration device 120 may be a hydraulically powered device.

FIG. 3 is a flowchart illustrating an example dynamic resonance method 300. At step 310, controller 210 detects the current atmospheric conditions of the air flowing through inlet grid 110. Atmospheric conditions may be any suitable conditions that indicate a likelihood that ice may accumulate on inlet grid 110. Atmospheric conditions may include, but are not limited to, temperature readings, precipitation measurements, meteorological reports (e.g., cloud types and formations), and elevation.

At step 320, controller 210 determines whether the atmospheric conditions are likely to lead to the accumulation of ice on inlet grid 110. If yes, the sequence proceeds to step 330, if no, the sequence may proceed to step 310 and resume checking the atmospheric conditions. In this manner, controller 210 may reduce the power needed to prevent the accumulation of ice on inlet grid 110 by limiting the operation of vibration devices 120 to icing conditions.

At step 330, controller 210 transmits vibration signal 222 to at least one vibration device 120 that is coupled to inlet grid 110. Controller 210 may utilize signal generator 220 to select specific frequencies to transmit to vibration devices 120. For example, controller 210 may store a pre-determined number of resonant frequencies tailored to inlet grid 110.

At step 340, vibration devices 120 may receive and oscillate at the frequency according to vibration signal 222. At step 350, controller 210 may utilize one or more sensors to determine whether the oscillation of vibration devices 120 is inducing inlet grid 110 to resonate at a natural frequency. For example, inlet grid 110 may have one or more accelerometers or vibrational sensors to determine the amplitude response to vibration devices 120 oscillating according to vibration signal 222. If inlet grid 110 is not resonating at a natural frequency, the sequence may proceed to step 360. If the sequence is oscillating at a natural frequency, the sequence may proceed to step 370.

At step 360, controller 210 may modify vibration signal 222 transmitted to at least one vibration device 120. By adjusting the frequency at which at least one vibration device 120 oscillates, controller 210 may determine a natural frequency of inlet grid 110. In some embodiments, the natural frequency of inlet grid 110 may change due to the buildup of ice which may increase the mass or stiffness of inlet grid 110. Controller 210 may continue to adjust vibration signal 222 until a natural frequency of inlet grid 110 is determined.

At step 370, vibration devices 120 continue to oscillate causing inlet grid 110 to resonate at the natural frequency to induce one or more mode shapes in inlet grid 110. The vibrational energy of the mode shapes may then prevent the accumulation of ice on inlet grid 110.

Controller 210 may continue to transmit vibration signal 222 to vibration devices 120 for any appropriate period of time. For example, controller 210 may transmit vibration signal 222 before entering a cloud containing super cooled water, and continue operating until the aircraft has left the cloud. In some embodiments, inlet grid 110 may be part of a ventilation system on a building in an arctic climate.

Controller 210 may transmit vibration signals 222 while freezing precipitation is falling.

Various embodiments may perform some, all, or none of the steps described above. For example, in certain embodiments, controller 210 and vibration devices 120 may be combined to perform each step of method 300 from a single device. Furthermore, certain embodiments may perform these steps in a different order or in parallel. Moreover, one or more steps may be repeated. Any suitable component of system 100 may perform one or more steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

For example, although FIG. 1 depicts vibration devices 120a through 120n and example embodiments are illustrated using vibration device 120a, one or more of the other vibration devices 120 may perform the actions described using vibration device 120a while being similar or different in structure and function. Furthermore, the description of vibration devices 120a through 120n represents any number of components (from 1 through n) and is not necessarily limited to the four depicted vibration devices 120.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:
   detecting, using a controller, an atmospheric condition sufficient for accumulation of ice on an inlet grid, the inlet grid configured to reduce distortion of an airflow passing through the inlet grid;
   transmitting, using the controller, a first vibration signal to a first vibration device and a second vibration signal to a second vibration device, the first and second vibration devices coupled to the inlet grid;
   resonating, by the first vibration device in response to the first vibration signal, the inlet grid at a first natural frequency of the inlet grid, thereby inducing a first mode shape in the inlet grid;
   resonating, by the second vibration device in response to the second vibration signal, the inlet grid at a second natural frequency of the inlet grid, thereby inducing a second mode shape in the inlet grid;
   wherein the first and second mode shapes superimpose at one or more anti-nodes of the inlet grid to break up and prevent ice on the inlet grid.

2. The method of claim 1, wherein the first vibration device has a first excitation direction and the second vibration device has a second excitation direction.

3. The method of claim 1, wherein the first and second vibration devices are selected from the group comprising a piezoelectric shaker and a hydraulically powered shaker.

4. The method of claim 1, wherein the first and second vibration devices comprise an electromagnetic shaker.

5. The method of claim 1, wherein the controller stops transmitting the first and second vibration signals to the first and second vibration devices in response to determining that the atmospheric condition sufficient for ice accumulation are no longer present.

6. A non-transitory computer readable storage medium comprising logic, the logic operable, when executed by the processor to:
   detect an atmospheric condition sufficient for an accumulation of ice on an inlet grid, the inlet grid configured to reduce distortion of airflow through the inlet grid;
   transmit a first vibration signal to a first vibration device and a second vibration signal to a second vibration device, the first and second vibration devices coupled to the inlet grid;
   resonate, by the first vibration device in response to the first vibration signal, the inlet grid at a first natural frequency of the inlet grid, thereby inducing a first mode shape in the inlet grid; and
   resonate, by the second vibration device in response to the second vibration signal, the inlet grid at a second natural frequency of the inlet grid, thereby inducing a second mode shape in the inlet grid; the first and the second mode shapes superimpose at one or more antinodes of the inlet grid to break up and prevent ice on the inlet grid.

7. The non-transitory medium of claim 6, wherein the first vibration device has a first excitation direction and the second vibration device has a second excitation direction.

8. The non-transitory medium of claim 6, wherein the first and second vibration devices are selected from the group consisting of a piezoelectric shaker, a hydraulically powered shaker, and an electromagnetic shaker.

9. The non-transitory medium of claim 6, wherein the logic is further operable, when executed by a processor to to:
   detect an increased mass or stiffness of the inlet grid due to an accumulation of ice; and
   modify the first vibration signal transmitted to the first vibration device to compensate for the change in natural frequency due to the increase in mass or stiffness.

* * * * *

UNITED STATES PATENT AND TRADEMARK OFFICE
CERTIFICATE OF CORRECTION

| | | |
|---|---|---|
| PATENT NO. | : 9,737,916 B2 | |
| APPLICATION NO. | : 14/833306 | |
| DATED | : August 22, 2017 | |
| INVENTOR(S) | : William Schneider et al. | |

It is certified that error appears in the above-identified patent and that said Letters Patent is hereby corrected as shown below:

In the Claims

Column 12, Line 16: After "logic is further operable, when executed by a processor to" and before ":" please delete "to".

Signed and Sealed this
Tenth Day of October, 2017

Joseph Matal
*Performing the Functions and Duties of the*
*Under Secretary of Commerce for Intellectual Property and*
*Director of the United States Patent and Trademark Office*